United States Patent Office 3,291,899
Patented Dec. 13, 1966

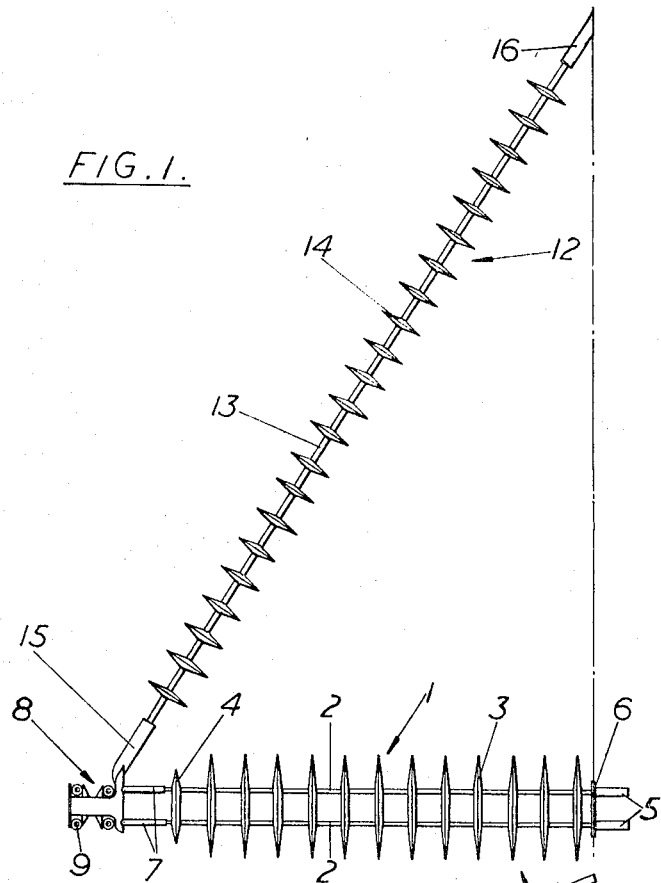
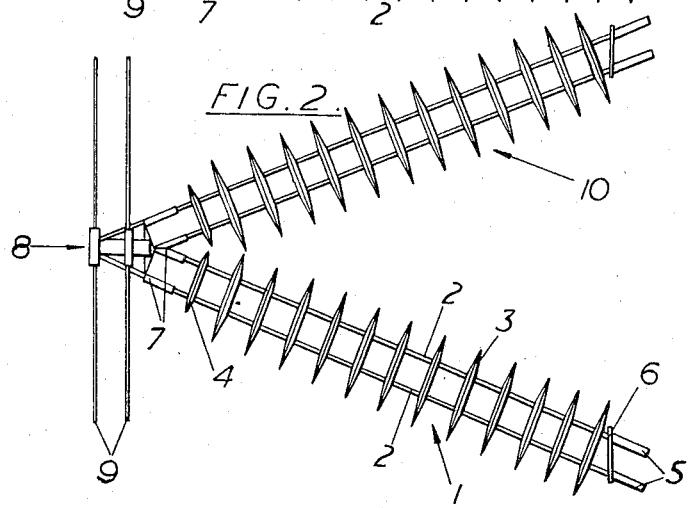

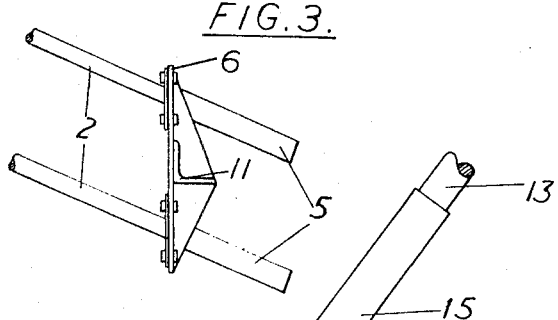
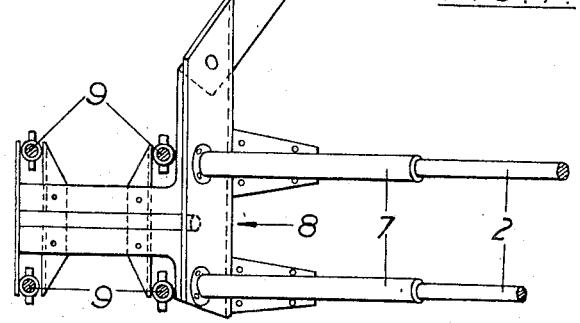
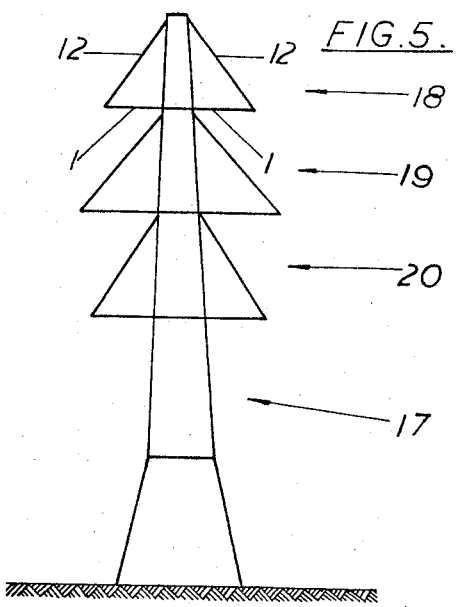

3,291,899
ELECTRIC INSULATORS IN THE FORM OF FRAMED STRUCTURES INCORPORATING RODS OF RESIN BONDED FIBRE
Percy James Alfred Ward, London, and Kenneth Albert Austin, Bexleyheath, Kent, England, assignors to British Insulated Callender's Cables Limited, London, England, a British company
Filed Apr. 16, 1965, Ser. No. 448,717
Claims priority, application Great Britain, Apr. 21, 1964, 16,492/64
15 Claims. (Cl. 174—148)

This invention relates to insulators for supporting electric conductors, more especially but not exclusively the conductors of overhead electric transmission lines. The insulators may form structural members of or the only structural members of cross-arms or framed structures for supporting overhead line conductors from a pole or tower and can themselves be used as cross-arms for directly supporting such conductors, i.e. without the use of the pin insulators or insulator strings normally used.

Other conductors that can be directly or indirectly supported by the insulators are, for example, bus-bars and the overhead contact wires of railway electrification systems, the insulators may for example be used as steady arms in such systems.

An object of the invention is to provide a rigid insulator that is light in weight but has good compressive and tensile strengths and an adequate leakage path for use at very high voltages.

Rods of resin bonded fibres of glass and other fibres of high tensile strength have been proposed for use as tension members in electrical insulators. The present invention is based on our discovery that such rods can be used as the longitudinal members of a structure, similar to a Vierendeel girder, in which the cross-members are also of insulating material and function both as structural members, by virtue of the rigidity of the joints between them and the longitudinal members, and as insulating members for increasing the surface leakage path along the structure to that required for outdoor use.

The insulator in accordance with the invention comprises two or more rods of resin bonded fibre of high tensile strength spaced apart along their length by a number of mutually spaced insulating cross-members which are rigidly jointed to the rods at intervals in such a way as to act as structural members of the insulator restraining the rods from buckling under compressive loads and also to increase the surface leakage path along the insulator.

The term "resin bonded fibre" is used, in its normal sense, to refer to resin bonded fibres of substantial length such that the fibres provide a substantial proportion of the tensile strength of the material.

The size and shape of the cross-members can be graded along the length of the insulator in order to give the most economical structure in respect of both its mechanical strength and the adequacy of the leakage path for the conditions under which the structure is designed to operate. If necessary, the leakage path can be further increased by mounting supplementary insulating members on the rods, between the cross-members.

Fibres of high tensile strength suitable for use in accordance with the invention are glass fibres, quartz fibres and lava fibres. The fibre most readily available at present and the fibre that we prefer to use is glass fibre.

Generally, we prefer to use at least three rods arranged symmetrically around the axis of the insulator. The insulating cross-members are preferably discs. They may be pre-formed with apertures through which the rods pass or formed in situ on the rods.

Means for directly or indirectly supporting an electric conductor is attached to the rods at one end of the insulator and means for securing the insulator to a support (or to another conductor when the insulator is used for spacing conductors) is attached to the rods at the other end of the insulator.

The rods are preferably solid, although hollow rods having a wall thickness such that they are of adequate strength may be used. The rods are preferably straight and parallel to each other but they may be curved and, whether they are straight or curved, the distance between them may vary along the length of the insulator, preferably in a regular manner such that the cross-section of the insulator is always symmetrical about its axis.

The rods may for example be bowed outwards, that is to say they are nearest to the axis of the insulator at the ends of the insulator and diverge from both ends in an arc shape to a maximum separation at about the middle of the insulator.

The rods are preferably of the kind made, for example, by a continuous longitudinal forming process or cut from pressure-moulded resin-bonded reinforced glass fibre, in which at least the major proportion of the fibres lies substantially parallel to the axis of the rod, any additional fibres not so arranged providing circumferential or lateral reinforcement, should it be required. They are normally of square or circular cross-section and, to enable the insulator to be used either as strut or cantilever, are preferably spaced apart by a distance equal to several times their maximum cross-sectional dimension. They can be attached at their ends to metal or other brackets by any suitable means, for example they may fit into malleable metal sleeves to which they are secured by compression jointing or by an adhesive, they may be shaped, as by threading, to interlock with corresponding parts of the brackets, or, particularly when they are cut from pressure-moulded resin-bonded glass fibre, they may be secured by bolts to the brackets.

The resin used for bonding the glass fibres to form the rods is preferably highly resistant to tracking, for example cyloaliphatic resins such as are sold by Bakelite Ltd. as E.P. 201. In other cases where the bonding resin is not highly resistant to tracking, for example when it is a normal epoxy resin, the resistance of the rods to tracking may be increased by coating the rods with a material that is more resistant to tracking than the bonding resin, for example butyl or ethylene-propylene rubbers or tracking resistant resins.

The insulating cross-members are also preferably made of a material highly resistant to tracking. Alternatively their resistance to tracking may be increased by a coating of a material more resistant to tracking. The material used for manufacture of the insulating cross-members must have sufficient strength and rigidity and the method of attaching the members to the rods must be such as to give the structure the desired mechanical properties; a suitable material is resin bonded glass fibre in a form that can be dough moulded in situ on the rods or a tracking resistant resin, for example a cycloaliphatic resin, that can be preformed as by vacuum casting and subsequently attached to the rods by an adhesive. Alternatively, they may be of compound construction consisting of a minimum of structurally strong material for tying the rods together encased in a material with anti-tracking characteristics, for example tracking resistant resins or butyl or ethylene-propylene rubbers. Similar materials may be used for the supplementary insulating members.

The desired rigidity of the structure is obtained either by ensuring that there is surface adhesion between the insulating cross-members and the rods or by causing the cross-members to interlock with the rods as, for example, by moulding them in situ over grooves or ribs or other projections or recesses preformed in or on the rods. A suitable adhesive is one based on the same resin as is used for bonding the fibres of high tensile strength to form the rods.

When the rods are tubular or the insulating cross-members or supplementary members are hollow they are preferably filled with a material that inhibits the entry of atmospheric moisture. The preferred filling material is a plastics foam, such as polyurethane; alternative filling materials are gaseous or liquid dielectrics.

Some or all of the insulating cross-members and/or the supplementary insulating members may be shaped, for example by the formation of ribs on a surface or surfaces, to increase the surface leakage path. They may also be shaped to act as insulator sheds, for example they may be shaped as hollow cones or as annuli of triangular or V cross-section.

The invention will be further illustrated by a description by way of example of insulators in accordance with the invention and a triangulated framed structure, for directly supporting an electric conductor from an overhead transmission line tower, incorporating two of the insulators.

In the drawings

FIGURES 1 and 2 are a side elevation and plan of the framed structure respectively, FIGURES 3 and 4 are a plan and elevation respectively showing structural details of parts of the framed structure, FIGURE 5 is an outline drawing of an overhead line transmission tower incorporating frame structures as shown in FIGURES 1–4, and FIGURES 6 to 9 are elevations, partly in section in FIGURES 7 and 9, of parts of the insulators.

The insulator 1 comprises four resin bonded glass fibre rods 2 of circular cross-section each 4 cm. diameter. The rods are of the kind made by drawing a number of glass fibre rovings into a bath of a cycloaliphatic resin, bunching the rovings while in the resin, drawing the bunched rovings out of the bath and through a circular shaping forming die or dies and partly curing the rods thus formed, as a continuous process. The rod is cut into lengths and the cut lengths are finally cured in batches. They are spaced apart by twelve circular discs 3 and a disc 4 dough moulded from resin bonded glass fibre, the moulding material used consisting of a tracking resistant polyester resin containing chopped glass fibre and hydrated aluminium oxide, for example as sold by British Industrial Plastics Ltd. as L 2430 S/B.

Each disc 3 is of approximately 75 cm. diameter and maximum thickness 8 cm., and the disc 4 is of about 60 cm. diameter and maximum thickness 8 cm. The discs, which taper towards their edges to form a rounded rim, are preformed and each provided with four holes to receive the rods 2, the holes being arranged at the corners of a square such that adjacent rods are spaced apart by 28 cm. centre to centre. The discs are equally spaced along the rods approximately 30 cm. apart, and are attached to the rods by an adhesive. The adhesive consists of a cycialiphatic resin and is applied before assembly of the structure both to the insides of the apertures in the discs and to the corresponding surface of the rods. It will be seen that the discs at least double the leakage path along the insulator.

A malleable metal sleeve is attached to each end of each rod by an adhesive or by a compression jointing technique and the sleeves 5 at one end of the rod are welded to a base plate 6 suitable for attachment to a tower and the sleeves 7 at the other end are welded to a bracket 8 suitable for attachment to the conductors to be supported by the insulator.

The triangulated framed structure shown in the drawings is designed for supporting a bundled conductor consisting of four component conductors 9, arranged at the corners of a square of side length 30 cm., forming part of a 400 kv. overhead transmission line. The structure comprises the insulator 1 as described above and an identical insulator 10 arranged to form the limbs of a V-shaped frame lying in a horizontal plane. The malleable metal sleeves 7 on the two insulators are all attached by welding to the single metal bracket 8 which supports all four component conductors 9 of the bundle. The metal plates 6 at the opposite ends of the insulators, to which the four malleable sleeves 5 of each insulator are welded, are each attached to a vertical member 11 of a tower of the overhead line.

The bracket 8 carrying the conductors 9 is supported also by a tie member 12 consisting of a resin bonded glass fibre rod 13 of 7 cm. diameter, of the same constitution as the rods 2, carrying along its length a number of smaller discs 14 similar to the discs forming part of the main insulators. The tie member 12 is attached at its lower end to the bracket 8 and at its upper end to the tower by malleable metal end sleeves 15 and 16 respectively, compression jointed to the rod or attached by an adhesive. The point of attachment of the tie member to the conductor bracket is such that the axis of the tie member passes through the centre of gravity of the bundled conductor. Preferably both the discs and the rods are made of resin bonded glass fibre which is highly resistant to tracking.

The insulators 1 and 10 function principally as struts but are capable of withstanding tensile stresses due to abnormal loadings or reversal of the external loadings.

Arch horns and grading rings of suitable dimensions (not shown) are provided to protect the insulated members from lightning and power arc flashovers and to improve the electric stress distribution.

FIGURE 5 shows in outline a lattice tower for supporting six bundled conductors, of four component conductors each, by means of six framed structures in accordance with the invention. The framed structures are attached to the tower 17 in three pairs, 18, 19 and 20, each of the structures of the three pairs being as shown in FIGURES 1–4 except that the dimensions of the insulators 1 and tie members 12 and the angles they make with each other are varied to provide for varying span widths between the bundled conductors, as shown.

Since the use of the insulated framed structures in this way obviates the use of string insulators, the dimensions of the line towers can be considerably reduced; for example for a 400 kv. line a standard intermediate tower carrying six bundles of four conductors can be reduced from a height of 50 metres to a height of 43 metres.

Although the insulators 1 and 10 have been shown in use only as components of a triangulated framed structure, they can with little modification be used singly as cross-arms, either as a cantilever structure, or as struts supported by a tension member, similar to the tie member 12.

Additional figures of the drawings, as follows, illustrate modifications already described:

Figure 6:
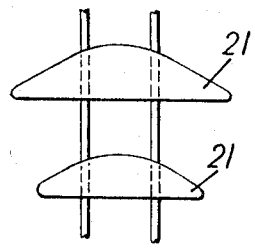
FIGURE 6 shows cross-members designed as sheds 21 for the insulator.
Figure 7:
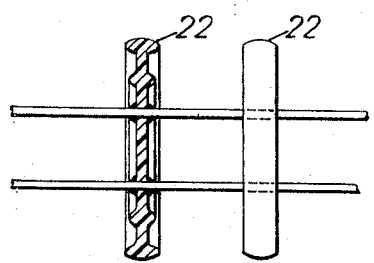
FIGURE 7 shows ribbed cross-members 22.
Figure 8:
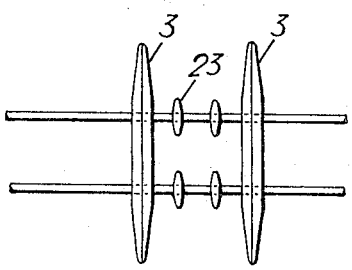
FIGURE 8 shows additional bodies 23 mounted between the discs 3.
Figure 9:
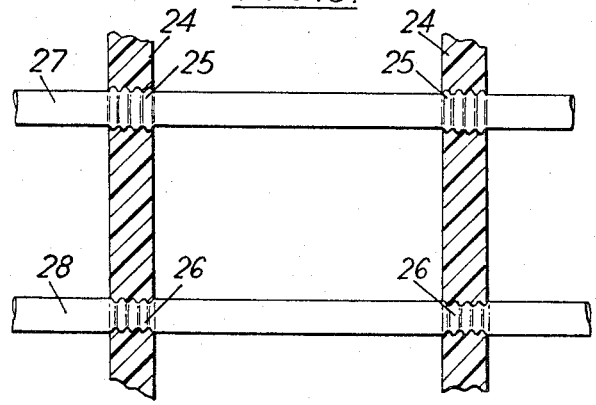

FIGURE 9 shows discs 24 formed over ribs 25 and grooves 26 in the rods 27 and 28 respectively.

What we claim as our invention is:

1. An insulator for supporting an electric conductor comprising a rigid structure having as principal structural elements at least three rods of resin bonded fibre of high tensile strength arranged symmetrically around the longitudinal axis of the structure, a plurality of mutually spaced insulating cross-members spacing said rods apart along their length, rigidly jointed to the rods at intervals, and shaped to increase the surface leakage path along the insulator, means for supporting an electric conductor attached to the rods at at least one end of the insulator and means attached to the rods at the other end of the insulator for securing the insulator to a support.

2. An insulator as claimed in claim 1 in which the insulating cross-members are in the form of discs which increase the surface leakage path along the insulator to at least substantially double that of the rods.

3. An insulator as claimed in claim 1 in which the rods are of resin bonded glass fibre in which the major proportion of the fibres lie substantially parallel to the axis of the rod.

4. An insulator as claimed in claim 1 in which the insulating cross-members are shaped to act as insulator sheds.

5. An insulator as claimed in claim 1 in which at least some of the insulating cross-members are formed with ribs on at least one surface to increase the surface leakage path.

6. An insulator as claimed in claim 1 in which supplementary insulators are mounted on the rods between the insulating cross-members and further increase the leakage path along the insulator.

7. An insulator as claimed in claim 1 in which the insulating cross-members are preformed bodies having apertures through which the rods pass and are secured to the rods by an adhesive.

8. An insulator as claimed in claim 1 in which the insulating cross-members and the rods have mutually adhering engaging surfaces.

9. An insulator as claimed in claim 8 in which the rods are formed with recesses into which ribs on the cross-members fit.

10. An insulator as claimed in claim 8, in which the rods are formed with projections which fit into recesses in the cross-members.

11. An insulator as claimed in claim 1 in which the rods are coated with a material more resistant to tracking than is the resin bonded fibre of high tensile strength.

12. A framed structure for supporting an electric conductor from a tower comprising at least one insulator comprising a rigid structure having as principal structural elements at least three rods of resin bonded fibre of high tensile strength arranged symmetrically about the longitudinal axis of the structure spaced apart along their length by a plurality of mutually spaced insulating cross-members which are rigidly jointed to the rods at intervals and shaped to increase the surface leakage path along the insulator, means attached to the rods at one end of all of the insulators for supporting an electric conductor and means for securing each insulator to the tower attached to the rods at the other end of each insulator.

13. A framed structure as claimed in claim 12 in which the cross-members are discs.

14. A triangulated framed structure for directly supporting an electric conductor from a tower comprising two insulators each comprising a rigid structure having as principal structural elements at least three rods of resin bonded fibre of high tensile strength arranged symmetrically around the longitudinal axis of the insulator, a plurality of mutually spaced insulating cross-members spacing said rods apart along their length, rigidly jointed to the rods at intervals, and shaped to increase the surface leakage path along the insulator, means for supporting the conductor from the triangulated structure comprising a single bracket attached to one end of the rods of both insulators, separate means spaced one from the other for attaching the opposite ends of the rods of each insulator to the tower each comprising a bracket attached to the rods of one insulator, and at least one insulating tie member attached to the means for supporting the conductor and attached to the tower above the points of attachment of the rods of the two insulators to support the two insulators in a substantially horizontal plane.

15. A framed structure as claimed in claim 14 in which the tie member is a rod of resin bonded fibre of high tensile strength carrying insulating bodies to increase its leakage path.

References Cited by the Examiner

UNITED STATES PATENTS 2,732,423    1/1956    Morrison.

FOREIGN PATENTS 664,189    6/1963    Canada.
699,040    12/1930    France.
915,052    1/1963    Great Britain.

LARAMIE E. ASKIN, *Primary Examiner.*